US008941635B2

(12) United States Patent
Onoue

(10) Patent No.: US 8,941,635 B2
(45) Date of Patent: Jan. 27, 2015

(54) DRIVING CIRCUIT FOR ELECTROPHORETIC DISPLAY DEVICE

(71) Applicant: Semiconductor Components Industries, LLC, Phoenix, AZ (US)

(72) Inventor: Toshiyuki Onoue, Ora-gun (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 171 days.

(21) Appl. No.: 13/754,493

(22) Filed: Jan. 30, 2013

(65) Prior Publication Data

US 2013/0194247 A1 Aug. 1, 2013

(30) Foreign Application Priority Data

Jan. 30, 2012 (JP) ................................ 2012-016122

(51) Int. Cl.

*G06F 3/038* (2013.01)
*G09G 5/00* (2006.01)
*G09G 3/34* (2006.01)
*G09G 3/04* (2006.01)

(52) U.S. Cl.

CPC ................. *G09G 3/344* (2013.01); *G09G 3/04* (2013.01); *G09G 2330/027* (2013.01); *G09G 2330/028* (2013.01)

USPC ................ 345/211; 345/107; 345/33; 345/34

(58) Field of Classification Search

USPC .............................. 345/210–214, 107, 33–34

See application file for complete search history.

(56) References Cited

U.S. PATENT DOCUMENTS

2007/0030243 A1* 2/2007 Ishii .............................. 345/107
2010/0123653 A1* 5/2010 Kwon et al. .................... 345/89
2010/0231571 A1* 9/2010 Tanabe .......................... 345/211

FOREIGN PATENT DOCUMENTS

JP 2009-229832 10/2009

* cited by examiner

*Primary Examiner* — Aneeta Yodichkas
*Assistant Examiner* — Brent Castiaux
(74) *Attorney, Agent, or Firm* — Rennie William Dover

(57) ABSTRACT

There is offered a driving circuit for an electrophoretic display device directed to avoiding a problem that clearing display on a display unit is not performed when the power supply is lost and a wrong display such as wrong time display is left unchanged. In the driving circuit for the electrophoretic display device, either a display clearing signal or a display retaining signal is set in a display setting register in advance. When the loss of the power supply is detected by a low voltage detection circuit while the display clearing signal is retained in the display setting register, the display on the display unit is cleared or retained in accordance with the setting in the display setting register.

20 Claims, 8 Drawing Sheets

DRIVING CIRCUIT FOR ELECTROPHORETIC DISPLAY DEVICE

CROSS-REFERENCE OF THE INVENTION

This application claims priority from Japanese Patent Application No. 2012-016122, filed Jan. 30, 2012, the content of which is incorporated herein by reference in its entirety.

BACKGROUND OF THE INVENTION

1. Field of the Invention

This invention relates to a driving circuit for an electrophoretic display device.

2. Description of the Related Art

An electrophretic display device provided with microcapsules including electrophoretic particles has been known as a kind of electronic paper (Refer to Japanese Patent Application Publication No. 2009-229832.). FIGS. 11A, 11B and 11C show a conventional driving circuit for the electrophoretic display device. A plurality of microcapsules 22 is interposed between a pixel electrode 20 and a common electrode 21 to form a pixel, as shown in the drawings. Although FIGS. 11A, 11B and 11C show a single pixel only, the electrophoretic display device has a display unit composed of a plurality of pixels that are structured similarly.

The microcapsule 22 is shaped like a grain in which a plurality of black particles (electrophoretic particles) 23, a plurality of white particles (electrophoretic particles) 24 and dispersion medium 25 are encapsulated, and has a particle diameter of approximately 30-50 μm, for example. An outer shell of the microcapsule 22 is formed using acrylic resin such as polymethyl methacrylate and polyethyl metacrylate or transparent polymer resin such as urea resin and gum arabic, for example.

The black particles 23 are polymer or colloid particles made of black pigment such as aniline black and carbon black, for example, and are charged negatively, for example. The white particles 24 are polymer or colloid particles made of white pigment such as titanium dioxide, zinc oxide and antimony trioxide, for example, and are charged positively, for example. The dispersion medium 25 is a liquid dispersing the black particles 23 and the white particles 24 inside the microcapsule 22, and is made of water or alcoholic solvent, for example.

The pixel electrode 20 is made of translucent conductive material such as ITO (Indium Tin Oxide). A drive voltage output circuit DRV0 outputs to the pixel electrode 20 a drive voltage corresponding to two bits of display data A0 and B0 that are inputted from outside. A common voltage Vcom is applied to the common electrode 21 that is made of metal such as aluminum, for example. The common voltage Vcom is assumed to be a ground voltage (0 V) in the following explanation.

The drive voltage output circuit DRV0 outputs +15 V as the drive voltage when the display data A0=H and B0=L ("H" denotes a high level and "L" denotes a low level.), as shown in FIG. 11A. Then, the black particles 23 converge on the pixel electrode 20 side in the microcapsule 22 while the white particles 24 converge on the common electrode 21 side in the microcapsule 22, since there is formed an electric field directed from the pixel electrode 20 to the common electrode 21. As a result, the pixel displays black.

The drive voltage output circuit DRV0 outputs −15 V as the drive voltage when the display data A0=L and B0=H, as shown in FIG. 11B. Then, contrary to the case shown in FIG. 11A, the white particles 24 converge on the pixel electrode 20 side in the microcapsule 22 while the black particles 23 converge on the common electrode 21 side in the microcapsule 22, since there is formed an electric field directed from the common electrode 21 to the pixel electrode 20. As a result, the pixel displays white.

The drive voltage output circuit DRV0 outputs 0 V as the drive voltage when the display data A0=L and B0=L, as shown in FIG. 11C. Because the common electrode 21 and the pixel electrode 20 are at the same electric potential, there is formed no electric field between the common electrode 21 and the pixel electrode 20. Therefore, the pixel keeps immediately preceding display that is white, for example. Inputting the display data A0=H and B0=H is prohibited.

As described above, since the display is switched by changing the direction of the electric field between the common electrode 21 and the pixel electrode 20 as shown in FIGS. 11A and 11B, and the display is maintained by eliminating the electric field after switching the display as shown in FIG. 11C with the conventional driving circuit for the electrophoretic display device, it is made possible to realize a low power consumption display device. Also, it has a feature that when the power supply of the drive voltage output circuit DRV0 is turned off, the display immediately before the turning off of the power supply is maintained.

Therefore, the power supply is turned off after the display on the display unit is cleared (making all pixels display black, for example), or in the state in which the display on the display unit is maintained.

However, when the power supply is lost (when the battery is pulled out, for example), clearing the display on the display unit is not performed and the display before losing the power supply is left unchanged. In that case, there is caused a problem that a wrong display such as displaying wrong time is left unchanged, for example.

This invention is directed to offering a driving circuit for an electrophoretic display device, which makes it possible that either the display on the display unit is to be cleared or maintained is set in advance, and that when the power supply is lost, the loss of the power supply is detected and either clearing or maintaining the display on the display unit is performed in accordance with the setting.

SUMMARY OF THE INVENTION

This invention provides a driving circuit for an electrophoretic display device that has a common electrode to which a common voltage is applied, a pixel electrode and an electrophoretic particle interposed between the common electrode and the pixel electrode, having a first backup capacitor retaining a first voltage that is higher than a power supply voltage, a second backup capacitor retaining a second voltage that is higher than the first voltage, a third backup capacitor retaining a third voltage that is generated by inverting the second voltage with reference to the common voltage, a display setting register retaining either a display clearing signal or a display maintaining signal, a low voltage detection circuit detecting a reduction in the power supply voltage, a display setting circuit outputting the display clearing signal when the low voltage detection circuit detects the reduction in the power supply voltage while the display setting register retains the display clearing signal, and a drive voltage output circuit outputting one of the second voltage, the third voltage and the common voltage to the pixel electrode in accordance with display data as well as outputting the second voltage or the third voltage to the pixel electrode in accordance with the display clearing signal.

DETAILED DESCRIPTION OF THE INVENTION

[Overall Structure of Driving Circuit for Electrophoretic Display Device]

Figure 1:
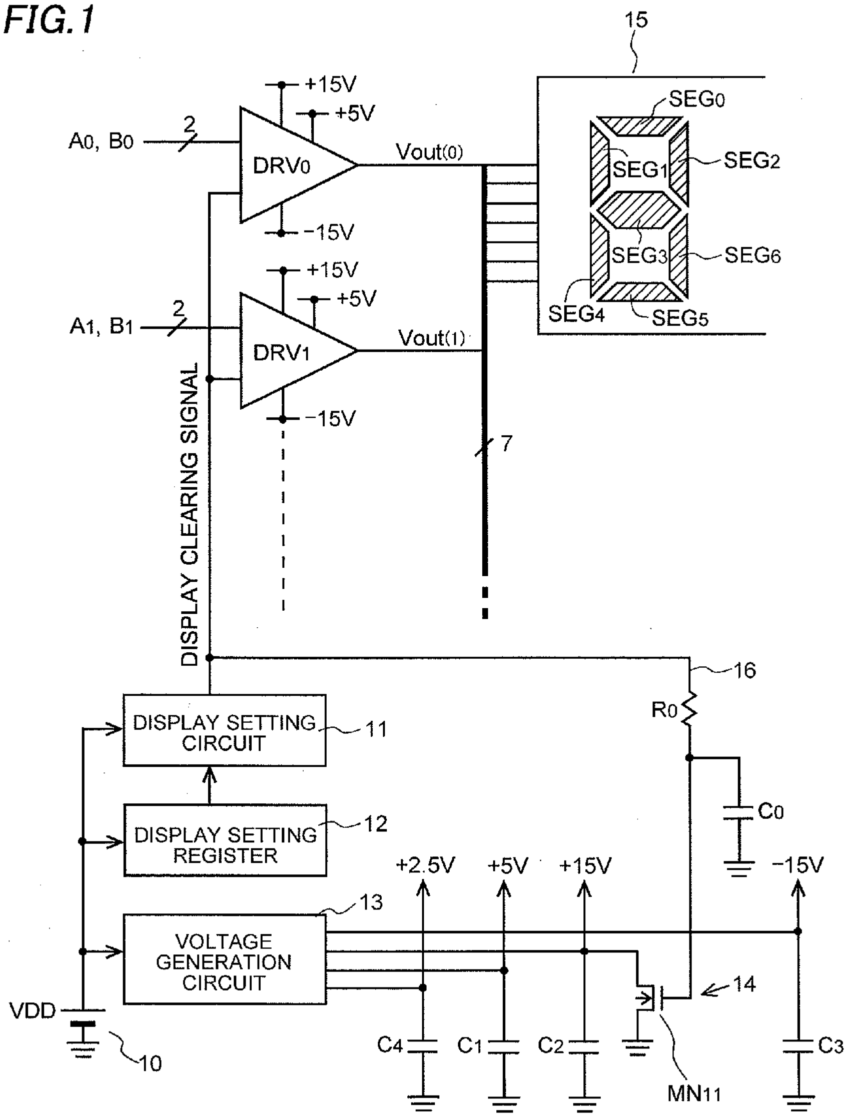
FIG. 1 shows an overall structure of a driving circuit for an electrophoretic display device according to an embodiment of this invention.

FIG. 1 shows an overall structure of a driving circuit for an electrophoretic display device according to an embodiment of this invention. FIGS. 2A, 2B, 2C and 2D are to explain a structure and displaying states of a segment (pixel) in the electrophoretic display device according the embodiment of this invention.

Figure 11A:
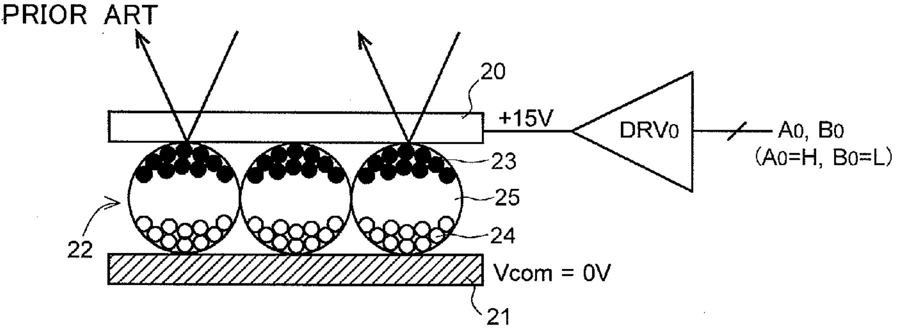
FIG.11A PRIOR ART
FIGS. 11A, 11B and 11C are to explain a conventional electrophoretic display device and its displaying states.
Figure 11B:
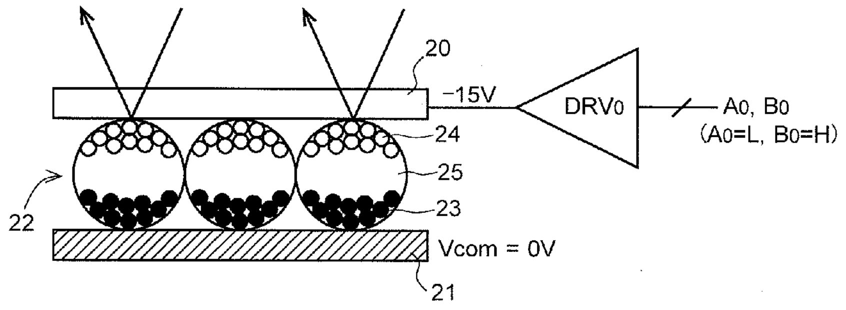
FIG.11B PRIOR ART
Figure 11C:
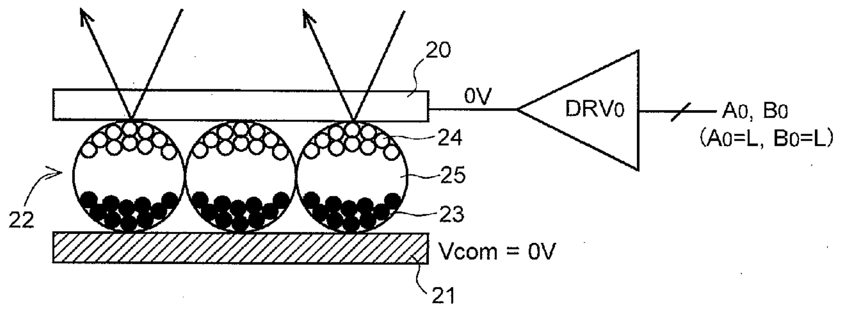
FIG.11C PRIOR ART

The electrophoretic display device is provided with a display unit formed on a display panel 15. The display unit is provided with first through seventh segments (a plurality of pixels) SEG0-SEG6 in this case. Each of the segments SEG0-SEG6 has the same structure as the pixel shown in FIG. 11 that is explained in the related art. While the display unit shown in FIG. 1 is capable of displaying numeric characters 0-9 and alphabetical characters A, B, C and so on, an actual display unit may have more segments (pixels) arrayed on the display panel 15.

The driving circuit for the electrophoretic display device is formed to include a power supply 10 (battery, for example) generating a power supply voltage VDD, a display setting circuit 11, a display setting register 12, a voltage generation circuit 13, first through fourth back capacitors C1, C2, C3 and C4, a discharging circuit 14 and seven drive voltage output circuits DRV0-DRV6.

The voltage generation circuit 13 generates a first voltage (+5 V, for example) that is higher than the power supply voltage VDD (+3.3 V, for example), a second voltage (+15 V, for example) that is higher than the first voltage, a third voltage (−15 V, for example) that is generated by inverting the second voltage with reference to a common voltage (ground voltage 0 V, for example) and a fourth voltage (+2.5 V, for example) that is lower than the power supply voltage VDD.

Each of the first through fourth backup capacitors C1-C4 retains each of the first through fourth voltages, respectively. The display setting register 12 retains either a display clearing signal (at VDD, for example) or a display retaining signal (at 0 V, for example).

Figure 8:
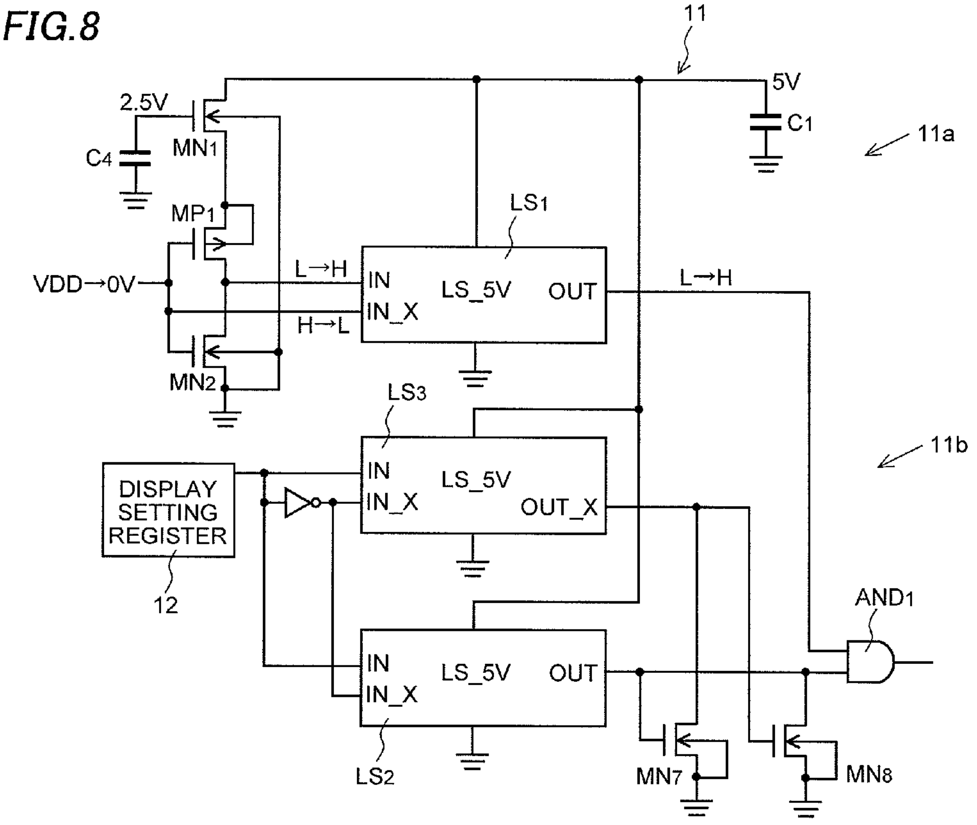
FIG. 8 is a circuit diagram of a display setting circuit.

The display setting circuit 11 has a low voltage detection circuit 11*a* that operates being provided with the first voltage (+5 V, for example) and detects a reduction in the power supply voltage VDD and a display control circuit 11*b* that operates being provided with the first voltage and outputs the display clearing signal when the reduction in the power supply voltage is detected by the low voltage detection circuit 11*a* while the display clearing signal is retained in the display setting register 12 (Refer to FIG. 8.).

Each of the drive voltage output circuits DRV0-DRV6 outputs one of the second voltage, the third voltage and the common voltage in accordance with display data inputted from outside and outputs the second voltage or the third voltage to clear the display on the display unit in accordance with the display clearing signal outputted from the display setting circuit 11 to a pixel electrode 20 of corresponding each of the segments SEG0-SEG6.

Operations of the drive voltage output circuit DRV0 that corresponds to the first segment SEG0 will be explained referring to Table 1 and FIGS. 2A, 2B, 2C and 2D. The same applies to each of the other drive voltage output circuits DRV1-DRV6. The common voltage Vcom at the common electrode 21 is assumed to be the ground voltage (0 V) in the following explanation. The display clearing signal is an H level signal while an L level signal corresponds to the display retaining signal.

TABLE 1

| Display Clearing Signal | Display Data B0 | Display Data A0 | Output |
|---|---|---|---|
| L | L | L | 0 V |
| L | L | H | +15 V |
| L | H | L | −15 V |
| L | H | H | +15 V or −15 V |
| H | L | L | +15 V |

Normal operations when the power supply voltage VDD is not reduced are the same as those of the conventional circuit. In this case, the display control circuit 11*b* does not output the display clearing signal and has no influence on the operation of the drive voltage output circuit DRV0 regardless of whether the display setting register 12 retains the display clearing signal or the display retaining signal.

Figure 2A:
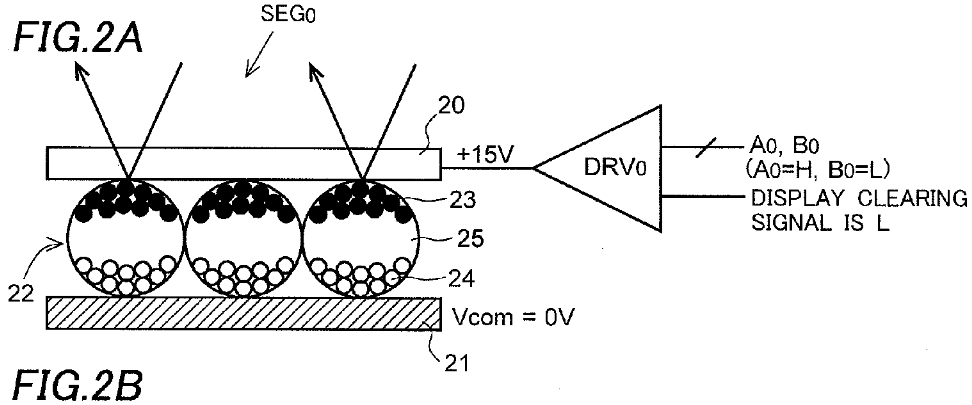
FIGS. 2A, 2B, 2C and 2D show a structure of a segment (pixel) and displaying states in the electrophoretic display device according the embodiment of this invention.

That is, the drive voltage output circuit DRV0 outputs +15 V as the drive voltage when the display data A0=H and B0=L, as shown in FIG. 2A. Then, the black particles 23 converge on the pixel electrode 20 side in the microcapsule 22 while the white particles 24 converge on the common electrode 21 side in the microcapsule 22, since there is formed an electric field directed from the pixel electrode 20 to the common electrode 21. As a result, the first segment SEG0 displays black.

Figure 2B:
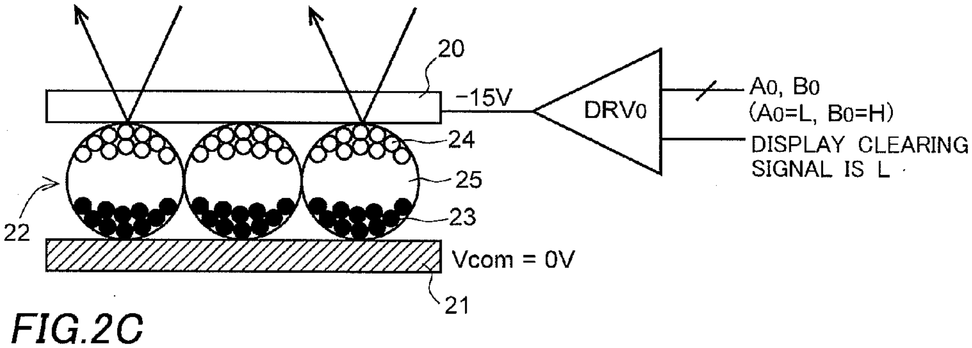

The drive voltage output circuit DRV0 outputs −15 V as the drive voltage when the display data A0=L and B0=H, as shown in FIG. 2B. Then, contrary to the case shown in FIG. 2A, the white particles 24 converge on the pixel electrode 20 side in the microcapsule 22 while the black particles 23 converge on the common electrode 21 side in the microcapsule 22, since there is formed an electric field directed from the common electrode 21 to the pixel electrode 20. As a result, the first segment SEG0 displays white.

Figure 2C:
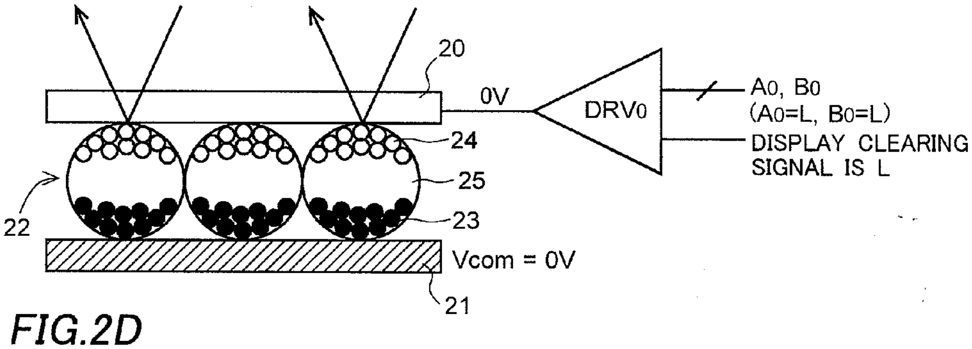

The drive voltage output circuit DRV0 outputs 0 V as the drive voltage when the display data A0=L and B0=L, as shown in FIG. 2C. Because the common electrode 21 and the pixel electrode 20 are at the same electric potential, there is formed no electric field between the common electrode 21 and the pixel electrode 20. Therefore, the first segment SEG0 keeps immediately preceding display that is white, for example. A legend DISPLAY CLEARING SIGNAL IS L shown in each of FIGS. 2A, 2B and 2C means that the display clearing signal is not outputted. Inputting the display data A0=H and B0=H is prohibited as in the case of the conventional circuit.

Figure 2D:
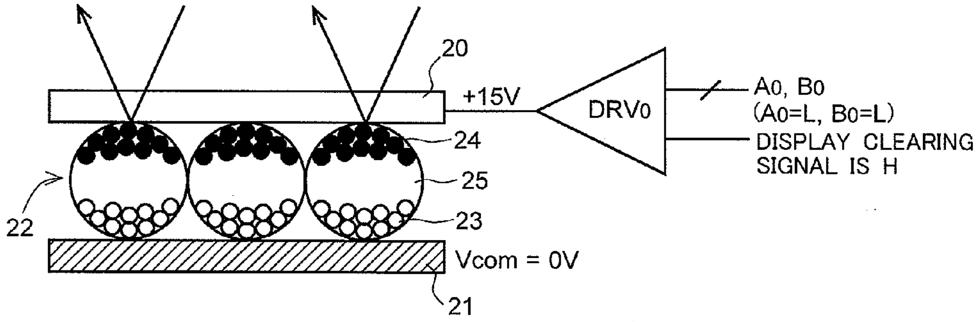

The display control circuit 11*b* outputs the display clearing signal of the H level in the case where the reduction in the power supply voltage due to the loss of the power supply 10 is detected by the low voltage detection circuit 11*a* while the display setting register 12 retains the display clearing signal, as shown in FIG. 2D. It is assumed that the display clearing signal is outputted in the display retaining state in which the display data A0=L and B0=L.

Then, the drive voltage output circuits DRV0-DRV6 corresponding to the first through seventh segments SEG0-SEG6 in the display unit output +15 V as the drive voltage. As a result, all the first through seventh segments SEG0-SEG6 display black. The drive voltage output circuits DRV0-DRV6 may be formed to output −15 V as the drive voltage instead. In this case, all the first through seventh segments SEG0-SEG6 display white as a result. In either case, the display on the display unit is cleared.

On the other hand, the display control circuit 11*b* outputs the display retaining signal in the case where the reduction in the power supply voltage due to the loss of the power supply 10 is detected by the low voltage detection circuit 11*a* while the display setting register 12 retains the display retaining signal. Then, the drive voltage output circuits DRV0-DRV6 output 0 V as the drive voltage. As a result, the first through seventh segments SEG0-SEG6 retain the display before the power supply is lost.

With the circuit according to the embodiment, it is made possible that whether the display on the display unit is to be cleared or maintained is set in the display setting register 12 in advance, and that the loss of the power supply is detected by the low voltage detection circuit 11*a* and the display on the display unit is cleared or maintained in accordance with the setting in the display setting register 12 when the power supply is lost. As a result, the problem that clearing the display on the display unit is not performed when the power supply is lost and the wrong display such as displaying wrong time is left unchanged can be avoided.

The discharging circuit 14 is activated after the display on the display unit is cleared by the display clearing signal and discharges electric charge stored in the second backup capacitor C2 that retains the second voltage (+15 V, for example) to the ground. That is, the second voltage retained by the second backup capacitor C2 becomes 0 V.

The discharging circuit 14 may be formed by connecting an N-channel type MOS transistor MN11 between a terminal of the second backup capacitor C2 and the ground and applying the output (display clearing signal) from the display control circuit 11*b* (Refer to FIG. 8.) to a gate of the N-channel type MOS transistor MN11, as shown in FIG. 1. Although the N-channel type MOS transistor MN11 is turned on when the display clearing signal from the display control circuit 11*b* is applied, there is caused a delay in its timing because of a signal delay to transfer the display clearing signal from the display control circuit 11*b* to the gate of the N-channel type MOS transistor MN11 through a wiring 16. In other words, the wiring 16 has a time constant (a resistor R0 and a capacitor C0).

Therefore, activating it after clearing the display on the display unit by the display clearing signal is made possible by adjusting the signal delay time due to the wiring 16.

Since each of the backup capacitors C1-C4 self-discharges after the power supply is lost, the first through fourth voltages retained by the backup capacitors C1-C4 become unstable. In the case where black is displayed when the display is cleared (All the first through seventh segments SEG0-SEG6 display black.), the second voltage (+15 V, for example) determines the output voltages from the drive voltage output circuits DRV0-DRV6. If nothing is done, the output voltages from the drive voltage output circuits DRV0-DRV6 also become unstable to make unintended display.

On the other hand, discharging the electric charge in the second backup capacitor C2 by the discharging circuit 14 immediately after clearing the display reduces the output voltages from the drive voltage output circuits DRV0-DRV6 to 0 V. As a result, the state after clearing the display (All the first through seventh segments SEG0-SEG6 display black.) is maintained stable.

In the case where white is displayed after the display is cleared, since similar problem is caused in this case also, the discharging circuit 14 is modified so that electric charge stored in the third backup capacitor C3 that retains the third voltage (−15 V, for example) is discharged to the ground. That is, although not shown in the drawing, the discharging circuit 14 may be formed by connecting the N-channel type MOS transistor MN11 between a terminal of the third backup capacitor C3 and the ground and applying the output (display clearing signal) from the display control circuit 11*b* to the gate of the N-channel type MOS transistor MN11.

By doing so, discharging the electric charge in the third backup capacitor C3 by the discharging circuit 14 immediately after clearing the display reduces the output voltages from the drive voltage output circuits DRV0-DRV6 to 0 V. As a result, the state after clearing the display (All the first through seventh segments SEG0-SEG6 display white.) is maintained stable.

Structures of components in the driving circuit for the electrophoretic display device according to the embodiment are hereafter explained in detail.

[Structure of Voltage Generation Circuit 13]

Figure 3:
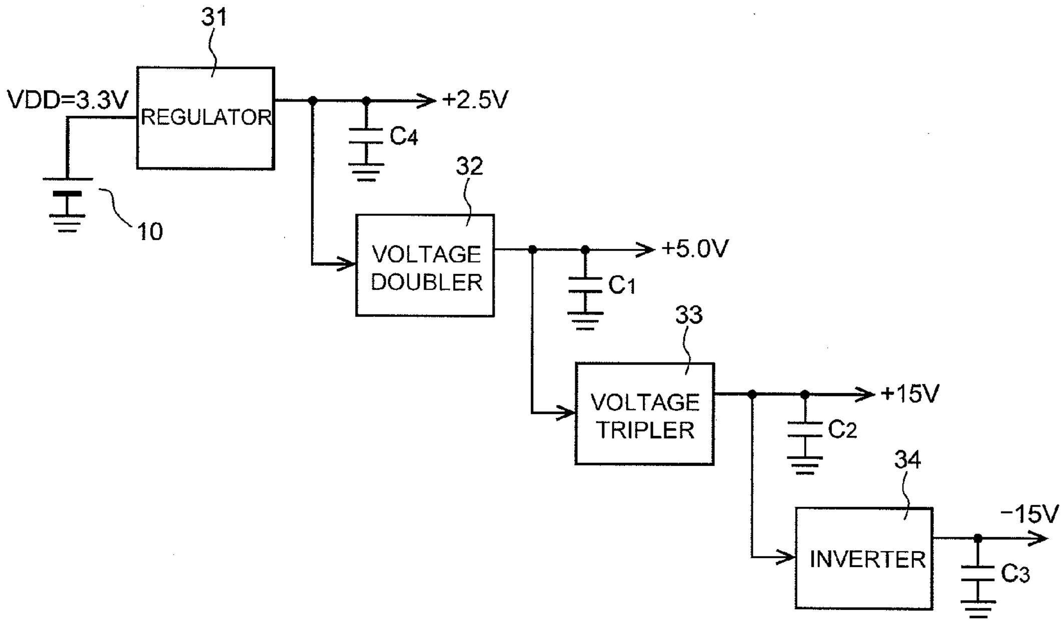
FIG. 3 is a block diagram of a voltage generation circuit.

The structure of the voltage generation circuit 13 is explained referring to FIG. 3 through FIG. 7. The voltage generation circuit 13 is formed to include a regulator 31, a voltage doubler 32, a voltage tripler 33 and an inverter 34, as shown in FIG. 3. Assuming the power supply voltage VDD is +3.3 V, the regulator 31 reduces the power supply voltage VDD to +2.5 V, for example, and outputs it as the fourth voltage. The fourth voltage of 2.5 V is retained by the fourth backup capacitor C4.

The voltage doubler 32 boosts +2.5 V to +5 V and outputs it. The voltage of +5 V is retained by the first backup capacitor C1. The voltage tripler 33 boosts +5 V to +15 V and outputs it. The voltage of +15 V is retained by the second backup capacitor C2. The inverter 34 inverts the voltage of +15 V with reference to the ground voltage of 0 V and outputs −15 V. The voltage of −15 V is retained by the third backup capacitor C3.

Figure 4:
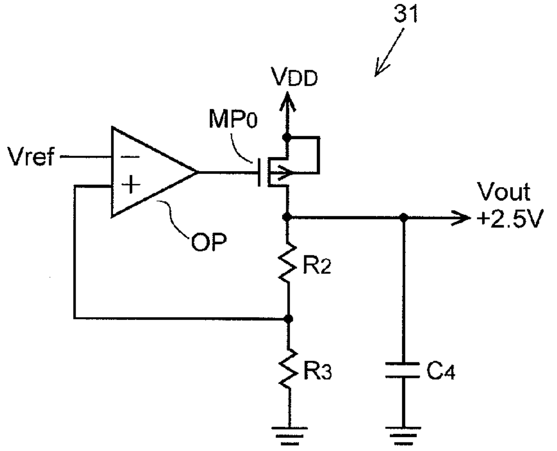
FIG. 4 is a circuit diagram of a regulator.

The regulator 31 is composed of an operational amplifier OP, a P-channel type MOS transistor MP0 and resistors R2 and R3, as shown in FIG. 4. A reference voltage Vref is applied to an inverting input terminal (−) of the operational amplifier OP, while a connecting node between the resistor R2 and the resistor R3 is connected to a non-inverting input terminal (+) of the operational amplifier OP. Then, the connecting node between the resistor R2 and the resistor R3 is set to Vref due to imaginary short of the operational amplifier OP.

Therefore, an output voltage Vout from the regulator 31 is represented by the following equation.

$$Vout = Vref\cdot(R2+R3)/R3 \tag{1}$$

where each of R2 and R3 represents a resistance of each of the resistors R2 and R3, respectively. Thus, the voltage of +2.5 V can be obtained as the output voltage Vout from the regulator 31 by setting R2, R3 and Vref as appropriate.

Figure 5:
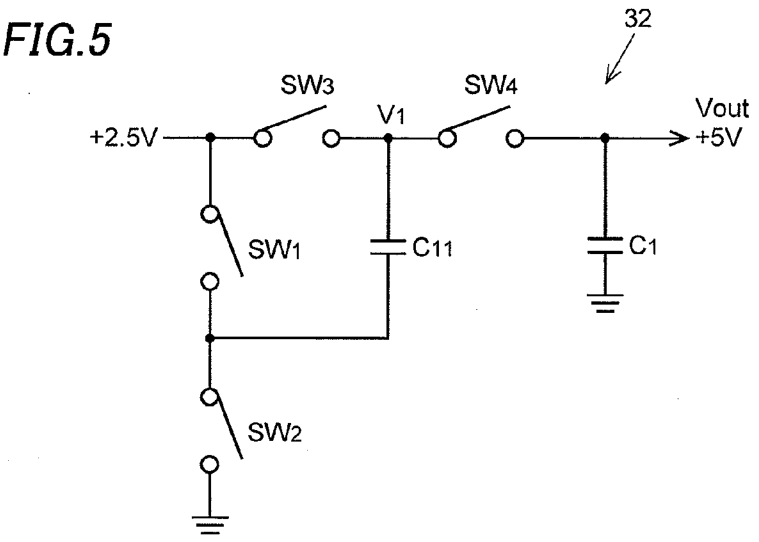
FIG. 5 is a circuit diagram of a voltage doubler.

The voltage doubler 32 is formed of a charge pump that is composed of switching devices SW1-SW4 and a capacitor C11, as shown in FIG. 5. Switching on/off of the switching devices SW1-SW4 are controlled as described below. In a first phase, SW1 is turned off, SW2 is turned on, SW3 is turned on and SW4 is turned off. As a result, the capacitor C11 is charged so that the voltage V1 becomes +2.5 V. In a subsequent second phase, SW1 is turned on, SW2 is turned off, SW3 is turned off and SW4 is turned on. As a result, the voltage V1 is boosted to +5 V. Since SW4 in the final stage is turned on in the second phase, the output voltage Vout becomes +5 V. The first and second phases alternate.

Figure 6:
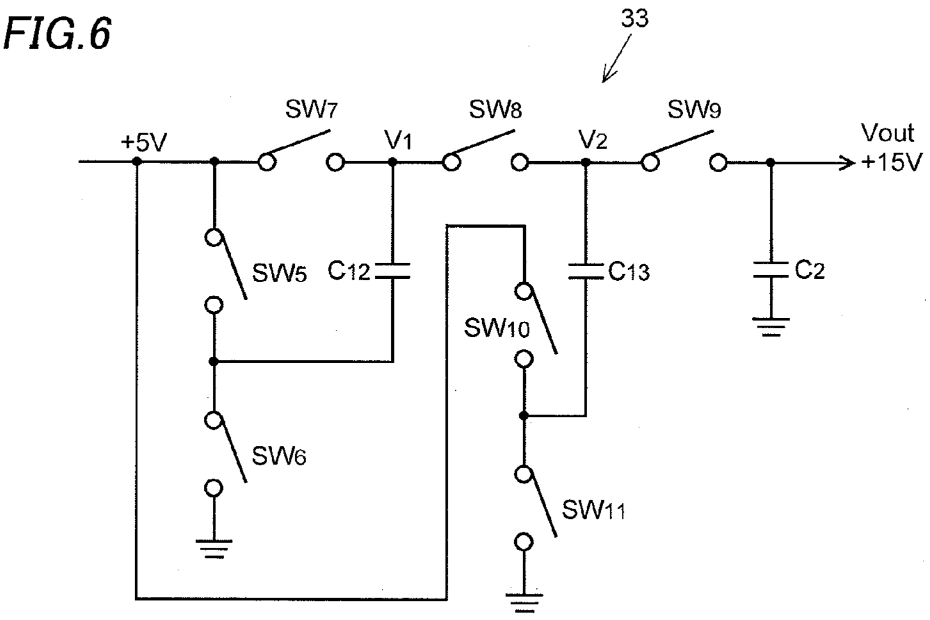
FIG. 6 is a circuit diagram of a voltage tripler.

The voltage tripler 33 is composed of switching devices SW5-SW11 and capacitors C12 and C13, as shown in FIG. 6. The switching devices SW5-SW11 are controlled in a similar way to that in the voltage doubler 32. In the first phase, SW5 is turned off, SW6 is turned on, SW7 is turned on, SW8 is turned off, SW9 is turned on, SW10 is turned on and SW11 is turned off. Thus, the capacitor C12 is charged while the capacitor C13 is discharged. That is, V1=5 V, and V2=+15 V. Since SW9 in the final stage is turned on, the output voltage Vout becomes +15 V.

In the second phase, SW5 is turned on, SW6 is turned off, SW7 is turned off, SW8 is turned on, SW9 is turned off, SW10 is turned off and SW11 is turned on. Thus, V1=V2=+10 V. The first and second phases alternate.

Figure 7:
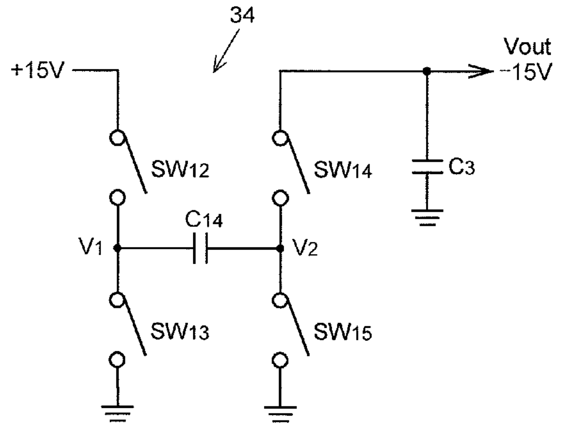
FIG. 7 is a circuit diagram of an inverter.

The inverter 34 is composed of switching devices SW12-SW15 and a capacitor C14, as shown in FIG. 7. In the first phase, SW12 is turned on, SW13 is turned off, SW14 is turned off and SW15 is turned on. Then, the voltage V1 at one of terminals of the capacitor C14 becomes +15 V while the voltage V2 at the other terminal of the capacitor C14 becomes 0 V. In the subsequent second phase, SW12 is turned off, SW13 is turned on, SW14 is turned on and SW15 is turned off. Then, V1 varies from +15 V to 0 V, and V2 varies from 0 V to −15 V accordingly, and −15 V is outputted as the output voltage Vout through SW14 that is in an ON state. The first and second phases alternate.

[Structure of Display Setting Circuit 11]

A structure of the display setting circuit 11 is explained referring to FIG. 8. The display setting circuit 11 is composed of the low voltage detection circuit 11*a* and the display control circuit 11*b*, as shown in FIG. 8. The low voltage detection circuit 11*a* includes three MOS transistors that are a first MOS transistor MN1 of N-channel type, a second MOS transistor MP1 of P-channel type and a third MOS transistor MN2 of N-channel type connected in series between the first voltage (+5 V) retained by the first backup capacitor C1 and the ground in the order mentioned above.

The first voltage V1 (+5 V) is applied to a drain of the first MOS transistor MN1 while the fourth voltage (+2.5 V) retained by the fourth backup capacitor C4 is applied to its gate.

The power supply voltage VDD from the power supply 10 is applied to an input terminal of an inverter that is formed of the second MOS transistor MP1 and the third MOS transistor MN2. When the power supply voltage VDD is reduced to 2.5 V−Vtn−Vtp or below, an output voltage from the inverter varies from 0 V to 2.5 V−Vtn. That voltage makes a low voltage detection signal. Vtn denotes a threshold voltage of the first MOS transistor MN1, and Vtp denotes a threshold voltage of the second MOS transistor MP1.

Figure 9:
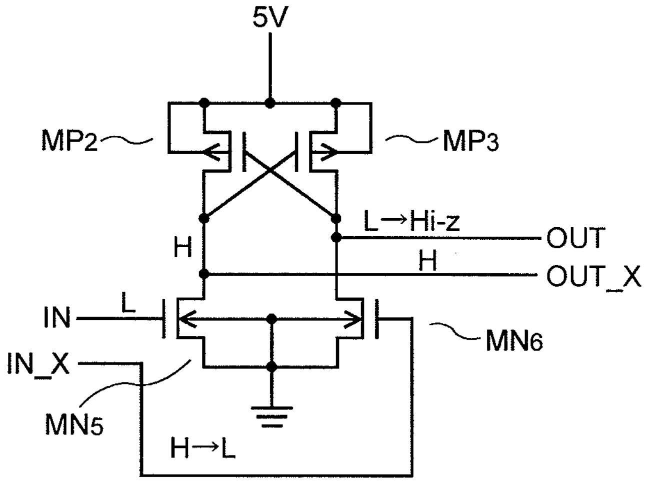
FIG. 9 is a circuit diagram of a level shift circuit.

The low voltage detection signal (2.5 V−Vtn) is level-shifted to the first voltage (+5 V) by a first level shift circuit LS1 in a subsequent stage. The first level shift circuit LS1 is formed to include fourth and fifth MOS transistors of P-channel type MP2 and MP3 that share a common source to which the first voltage (+5 V) is applied and have gates and drains cross-connected to each other, a sixth MOS transistor MN5 of N-channel type that is connected between the drain of the fourth MOS transistor MP2 and the ground and has a gate (corresponding to an input terminal IN) to which the output signal from the inverter is applied, and a seventh MOS transistor MN6 of N-channel type that is connected between the drain of the fifth MOS transistor MP3 and the ground and has a gate (corresponding to an input terminal IN_X) to which the power supply voltage VDD is applied, as shown in FIG. 9. The first level shift circuit LS1 has a circuit structure of a differential amplifier.

Since the low voltage detection circuit 11*a* has the structure described above through which no current flows normally, reducing power dissipation of the driving circuit can be sought after.

The display setting register 12 retains either the display clearing signal (at VDD=3.3 V, for example) or the display retaining signal (at 0 V, for example), as described above. The display control circuit 11*b* is provided with a second level shift circuit LS2 that level-shifts a voltage level of the display clearing signal retained in the display setting register 12 to the first voltage (+5 V) and holds the voltage level of the display clearing signal at the first voltage (+5 V) when the power supply voltage VDD is reduced, and an AND circuit AND1 to which the low voltage detection signal level-shifted by the first level shift circuit LS1 and the display clearing signal level-shifted by the second level shift circuit LS2 are inputted.

As a result, the display control circuit 11*b* outputs the display clearing signal level-shifted to +5 V when the reduction in the power supply voltage VDD is detected by the low voltage detection circuit 11*a* while the display clearing signal is retained in the display setting register 12.

Depending on the setting (display clearing or display maintaining) in the display setting register 12, the output signal from the second level shift circuit LS2 is either H (+5 V) or L (0 V) when the power supply is lost (or the power supply is turned off). When the power supply is lost (or the power supply is turned off) while the output signal is L, the output from the second level shift circuit LS2 becomes a high impedance state (intermediate voltage). Thus a third level shift circuit LS3 and N-channel type MOS transistors MN7 and MN8 are added to set the output from the second level shift circuit LS2 at the L level so that becoming the high impedance state is avoided. The second and third level shift circuits LS2 and LS3 have the same structure as the structure of the first level shift circuit LS1 shown in FIG. 9.

To summarize the operations of the display control circuit 11*b*, the output from the first level circuit LS1 varies from L to H (+5 V) when the power supply is lost (or the power supply is turned off) while the display clearing signal is retained in the display setting register 12. The output from the second level shift circuit LS2 holds the display clearing signal of H (+5 V). Thus, the output from the AND circuit AND1 becomes +5 V and the display clearing signal level-shifted to +5 V is outputted.

On the other hand, the output from the first level circuit LS1 varies from L to H (+5 V) when the power supply is lost (or the power supply is turned off) while the display retaining signal (0 V) is retained in the display setting register 12. The output from the second level shift circuit LS2 holds the display retaining signal of 0 V. Then, the output from the AND circuit AND1 becomes 0 V to output the display retaining signal (0 V) instead of the display clearing signal. At that time, the output from the second level shift circuit LS2 is fixed at 0 V by the third level shift circuit LS3 and the N-channel type MOS transistor MN8.

[Structure of Drive Voltage Output Circuits DRV0-DRV6]

Figure 10:
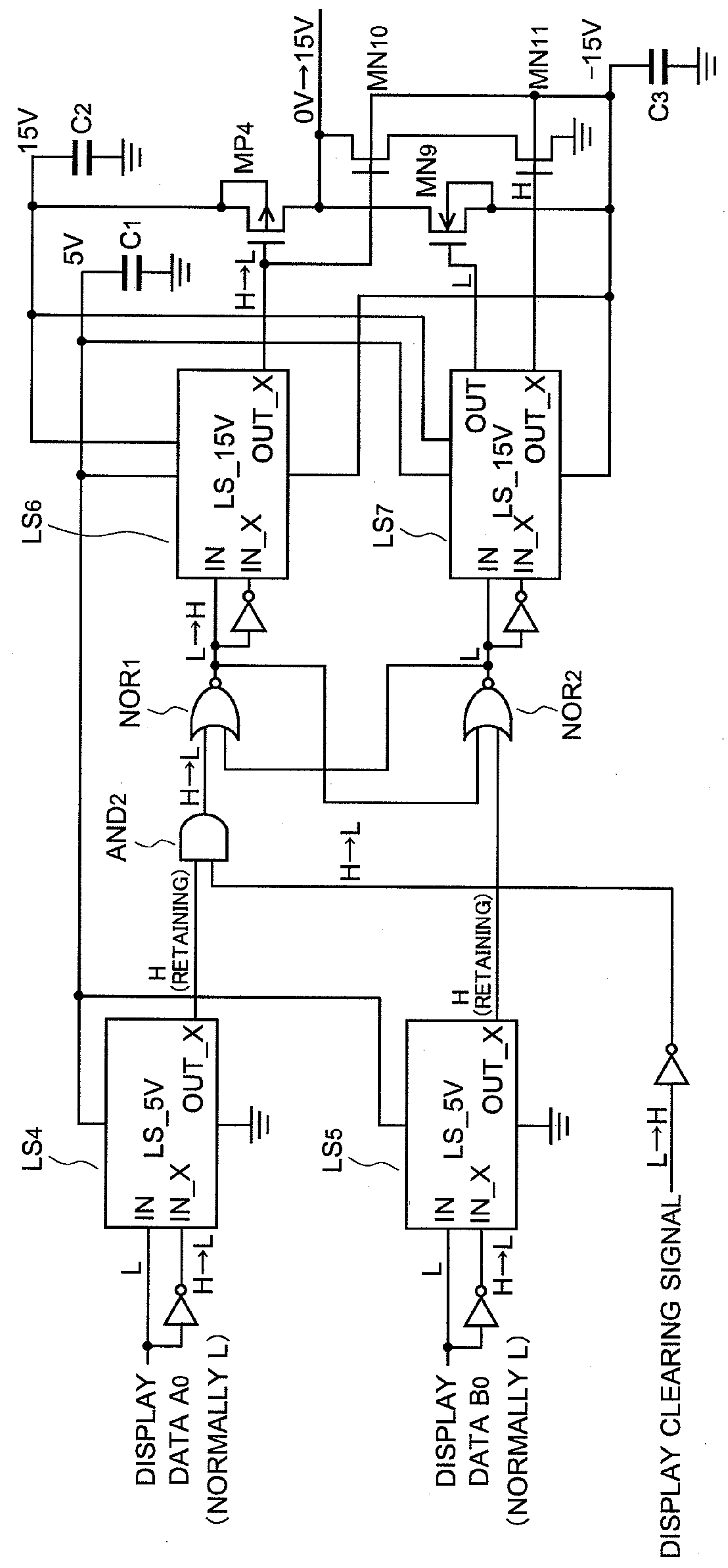
FIG. 10 is a circuit diagram of a drive voltage output circuit.

A structure of the drive voltage output circuit DRV0 is explained referring to FIG. 10. Each of the other drive voltage output circuits DRV1-DRV6 has the same structure as that of the drive voltage output circuit DRV0. The drive voltage output circuit DRV0 is formed to include a fourth level shift circuit LS4 (VDD→>+5 V), a fifth level shift circuit LS5 (VDD→5 V), an AND circuit AND2, a pair of NOR circuits NOR1 and NOR2 that are cross-inputted to each other, a sixth level shift circuit LS6 (+5 V→>+15 V), a seventh level shift circuit LS7 (+5 V→>+15 V), an output unit composed of a P-channel type MOS transistor MP4 and N-channel type MOS transistors MN9, MN10 and MN11, as shown in the drawing.

The fourth and fifth level shift circuits LS4 and LS5 level-shift VDD to +5 V. The sixth and seventh level shift circuits LS6 and LS7 level-shift +5 V to +15 V. Each of the fourth through seventh level shift circuits LS4-LS7 has the same structure as the structure shown in FIG. 9 but differs in supplied voltages.

Input/output characteristics of the drive voltage output circuit DRV0 are as shown in Table 1. FIG. 10 shows a level of each of nodes in the case where the power supply is lost while the display data A0=L and B0=L and the display clearing signal (H) is outputted from the display control circuit 11*b* to the drive voltage output circuit DRV0. In this case, the drive voltage output circuit DRV0 outputs +15 V (displays black). Although the display clearing function at the time of the power supply loss is put in operation only when the display data A0=L and B0=L (when the data is retained), there is no problem in actual use because the display data is A0=L and B0=L in normal use. The display setting circuit 11 may be modified so that the display clearing signal of the H level is outputted when the reduction in the power supply voltage is detected by the low voltage detection circuit 11*a* regardless of the signal retained in the display setting register 12 and the drive voltage output circuits DRV0-DRV6 output either the second voltage or the third voltage to the pixel electrodes to clear the display in response to the display clearing signal.

With the driving circuit for the electrophoretic display device according to the embodiment of this invention, it is made possible that whether the display on the display unit is cleared or maintained is set in advance, and that when the power supply is lost, the loss of the power supply is detected and the display on the display unit is cleared or maintained in accordance with the setting.

As a result, the problem that clearing the display on the display unit is not performed when the power supply is lost and the wrong display such as displaying wrong time is left unchanged can be avoided.

What is claimed is:

1. A driving circuit for an electrophoretic display device that comprises a common electrode to which a common voltage is applied, a pixel electrode and an electrophoretic particle interposed between the common electrode and the pixel electrode, the driving circuit comprising:

a first backup capacitor retaining a first voltage that is higher than a power supply voltage;

a second backup capacitor retaining a second voltage that is higher than the first voltage;

a third backup capacitor retaining a third voltage that is generated by inverting the second voltage with reference to the common voltage;

a display setting register retaining either a display clearing signal or a display retaining signal;

a low voltage detection circuit detecting a reduction in the power supply voltage;

a display setting circuit outputting the display clearing signal when the low voltage detection circuit detects the reduction in the power supply voltage while the display setting register retains the display clearing signal; and a drive voltage output circuit outputting the second voltage, the third voltage or the common voltage to the pixel electrode in accordance with display data, the drive voltage output circuit being configured to output the second voltage or the third voltage to the pixel electrode in accordance with the display clearing signal.

2. The driving circuit for the electrophoretic display device of claim 1, wherein the display setting circuit outputs the display retaining signal when the reduction in the power supply voltage is detected by the low voltage detection circuit when the display retaining signal is retained in the display setting register, and the drive voltage output circuit provides the pixel electrode with the common voltage in response to the display retaining signal outputted from the display setting circuit so that display is retained.

3. The driving circuit for the electrophoretic display device of claim 1, further comprising a fourth backup capacitor retaining a fourth voltage that is lower than the power supply voltage, wherein the low voltage detection circuit comprises an inverter and a first level shift circuit, the inverter comprising a first MOS transistor of N-channel type, a second MOS transistor of P-channel type and a third MOS transistor of N-channel type, the first MOS transistor having a source to which the first voltage is applied and a gate to which the fourth voltage is applied, the second MOS transistor and the third MOS transistor being connected in series between a drain of the first MOS transistor and a ground, the power supply voltage being applied to an input terminal of the inverter, the inverter outputting a low voltage detection signal from its output terminal when the power supply voltage is reduced, the first level shift circuit level-shifting a voltage level of the low voltage detection signal to the first voltage.

4. The driving circuit for the electrophoretic display device of claim 3, wherein the first level shift circuit comprises fourth and fifth MOS transistors of P-channel type and sixth and seventh MOS transistors of N-channel type, the fourth and fifth MOS transistors sharing a common source to which the first voltage is applied and having gates and drains cross-connected with each other, the sixth MOS transistor being connected between the drain of the fourth MOS transistor and the ground and having a gate to which the signal from the inverter is applied, the seventh MOS transistor being connected between the drain of the fifth MOS transistor and the ground and having a gate to which the power supply voltage is applied.

5. The driving circuit for the electrophoretic display device of claim 3, wherein the display setting circuit comprises a second level shift circuit and an AND circuit, the second level shift circuit level-shifting a voltage level of the display clearing signal to the first voltage when the display clearing signal is retained in the display setting register as well as retaining the voltage level of the display clearing signal at the first voltage when the power supply voltage is reduced, the low voltage detection signal level-shifted by the first level shift circuit and the display clearing signal level-shifted by the second level shift circuit being inputted to the AND circuit.

6. The driving circuit for the electrophoretic display device of claim 5, wherein the second level shift circuit comprises eighth and ninth MOS transistors of P-channel type and tenth and eleventh MOS transistors of N-channel type, the eighth and ninth MOS transistors sharing a common source to which the first voltage is applied and having gates and drains cross-connected with each other, the tenth MOS transistor being connected between the drain of the eighth MOS transistor and the ground and having a gate to which an output signal from the display setting register is applied, the eleventh MOS transistor being connected between the drain of the ninth MOS transistor and the ground and having a gate to which an inversion signal of the output signal from the display setting register is applied.

7. The driving circuit for the electrophoretic display device of claim 1, further comprising a discharging circuit that discharges the second backup capacitor after display by the electrophoretic particle is cleared in response to the display clearing signal outputted from the display setting circuit.

8. The driving circuit for the electrophoretic display device of claim 7, wherein the discharging circuit comprises a switching device connected between a terminal of the second backup capacitor and a ground, the switching device being turned on in accordance with the display retaining signal outputted from the display setting circuit.

9. A driving circuit for an electrophoretic display device that comprises a common electrode to which a common voltage is applied, a pixel electrode and an electrophoretic particle interposed between the common electrode and the pixel electrode, the driving circuit comprising:

- a first backup capacitor retaining a first voltage that is higher than a power supply voltage;
- a second backup capacitor retaining a second voltage that is higher than the first voltage;
- a third backup capacitor retaining a third voltage that is generated by inverting the second voltage with reference to the common voltage;
- a display setting register retaining either a display clearing signal or a display retaining signal;
- a low voltage detection circuit detecting a reduction in the power supply voltage, the low voltage detection circuit being supplied with the first voltage;
- a display setting circuit outputting the display clearing signal when the low voltage detection circuit detects the reduction in the power supply voltage while the display setting register retains the display clearing signal, the display setting circuit being supplied with the first voltage; and
- a drive voltage output circuit outputting the second voltage, the third voltage or the common voltage to the pixel electrode in accordance with display data, the drive voltage output circuit being configured to output the second voltage or the third voltage to the pixel electrode in accordance with the display clearing signal so that display is cleared.

10. The driving circuit for the electrophoretic display device of claim 9, wherein the display setting circuit outputs the display retaining signal when the reduction in the power supply voltage is detected by the low voltage detection circuit when the display retaining signal is retained in the display setting register, and the drive voltage output circuit provides the pixel electrode with the common voltage in response to the display retaining signal outputted from the display setting circuit so that display is retained.

11. The driving circuit for the electrophoretic display device of claim 9, further comprising a fourth backup capacitor retaining a fourth voltage that is lower than the power supply voltage, wherein the low voltage detection circuit comprises an inverter and a first level shift circuit, the inverter comprising a first MOS transistor of N-channel type, a second MOS transistor of P-channel type and a third MOS transistor of N-channel type, the first MOS transistor having a source to which the first voltage is applied and a gate to which the fourth voltage is applied, the second MOS transistor and the third MOS transistor being connected in series between a drain of the first MOS transistor and a ground, the power supply voltage being applied to an input terminal of the inverter, the inverter outputting a low voltage detection signal from its output terminal when the power supply voltage is reduced, the first level shift circuit level-shifting a voltage level of the low voltage detection signal to the first voltage.

12. The driving circuit for the electrophoretic display device of claim 11, wherein the first level shift circuit comprises fourth and fifth MOS transistors of P-channel type and sixth and seventh MOS transistors of N-channel type, the fourth and fifth MOS transistors sharing a common source to which the first voltage is applied and having gates and drains cross-connected with each other, the sixth MOS transistor being connected between the drain of the fourth MOS transistor and the ground and having a gate to which the signal from the inverter is applied, the seventh MOS transistor being connected between the drain of the fifth MOS transistor and the ground and having a gate to which the power supply voltage is applied.

13. The driving circuit for the electrophoretic display device of claim 11, wherein the display setting circuit comprises a second level shift circuit and an AND circuit, the second level shift circuit level-shifting a voltage level of the display clearing signal to the first voltage when the display clearing signal is retained in the display setting register as well as retaining the voltage level of the display clearing signal at the first voltage when the power supply voltage is reduced, the low voltage detection signal level-shifted by the first level shift circuit and the display clearing signal level-shifted by the second level shift circuit being inputted to the AND circuit.

14. The driving circuit for the electrophoretic display device of claim 13, wherein the second level shift circuit comprises eighth and ninth MOS transistors of P-channel type and tenth and eleventh MOS transistors of N-channel type, the eighth and ninth MOS transistors sharing a common source to which the first voltage is applied and having gates and drains cross-connected with each other, the tenth MOS transistor being connected between the drain of the eighth MOS transistor and the ground and having a gate to which an output signal from the display setting register is applied, the eleventh MOS transistor being connected between the drain of the ninth MOS transistor and the ground and having a gate to which an inversion signal of the output signal from the display setting register is applied.

15. The driving circuit for the electrophoretic display device of claim 9, further comprising a discharging circuit that discharges the second backup capacitor after display by the electrophoretic particle is cleared in response to the display clearing signal outputted from the display setting circuit.

16. The driving circuit for the electrophoretic display device of claim 15, wherein the discharging circuit comprises a switching device connected between a terminal of the second backup capacitor and a ground, the switching device being turned on in accordance with the display retaining signal outputted from the display setting circuit.

17. A driving circuit for an electrophoretic display device comprising:

- a common electrode to which a common voltage is applied;
- a pixel electrode;
- an electrophoretic particle interposed between the common electrode and the pixel electrode;
- a first backup capacitor retaining a first voltage that is higher than a power supply voltage;
- a second backup capacitor retaining a second voltage that is higher than the first voltage; a third backup capacitor retaining a third voltage that is generated by inverting the second voltage with reference to the common voltage;

a low voltage detection circuit detecting a reduction in the power supply voltage;

a display setting circuit outputting a display clearing signal when the low voltage detection circuit detects the reduction in the power supply voltage; and a drive voltage output circuit outputting the second voltage, the third voltage or the common voltage to the pixel electrode in accordance with display data, the drive voltage output circuit being configured to output the second voltage or the third voltage to the pixel electrode in accordance with the display clearing signal.

18. The driving circuit for the electrophoretic display device of claim 17, further comprising a fourth backup capacitor retaining a fourth voltage that is lower than the power supply voltage, wherein the low voltage detection circuit comprises an inverter and a first level shift circuit, the inverter comprising a first MOS transistor of N-channel type, a second MOS transistor of P-channel type and a third MOS transistor of N-channel type, the first MOS transistor having a source to which the first voltage is applied and a gate to which the fourth voltage is applied, the second MOS transistor and the third MOS transistor being connected in series between a drain of the first MOS transistor and a ground, the power supply voltage being applied to an input terminal of the inverter, the inverter outputting a low voltage detection signal from its output terminal when the power supply voltage is reduced, the first level shift circuit level-shifting a voltage level of the low voltage detection signal to the first voltage.

19. The driving circuit for the electrophoretic display device of claim 17, further comprising a discharging circuit that discharges the second backup capacitor after display by the electrophoretic particle is cleared in response to the display clearing signal outputted from the display setting circuit.

20. The driving circuit for the electrophoretic display device of claim 19, wherein the discharging circuit comprises a switching device connected between a terminal of the second backup capacitor and a ground, the switching device being turned on in accordance with the display retaining signal outputted from the display setting circuit.

* * * * *